United States Patent [19]

Chen

[11] Patent Number: 5,084,643
[45] Date of Patent: Jan. 28, 1992

[54] VIRTUAL ROTOR BALANCING IN MAGNETIC BEARINGS

[75] Inventor: Hsiang M. Chen, Latham, N.Y.
[73] Assignee: Mechanical Technology Incorporated, Latham, N.Y.
[21] Appl. No.: 641,688
[22] Filed: Jan. 16, 1991
[51] Int. Cl.[5] .................. H02K 7/09; H02K 5/24; F16C 39/06; G05B 1/01
[52] U.S. Cl. ..................... 310/90.5; 73/462
[58] Field of Search ............. 310/90.5, 51; 73/462

[56] References Cited

U.S. PATENT DOCUMENTS

| | | | |
|---|---|---|---|
| 4,773,019 | 9/1988 | Martin et al. | 73/462 |
| 4,839,550 | 6/1989 | Mizuno et al. | 310/90.5 |
| 4,999,534 | 3/1991 | Andrianos | 310/90.5 |

FOREIGN PATENT DOCUMENTS 64-83916  3/1989  Japan ................... 310/90.5

Primary Examiner—Peter S. Wong
Assistant Examiner—D. L. Rebsch
Attorney, Agent, or Firm—Joseph C. Sullivan; Joseph V. Claeys

[57] ABSTRACT

The apparatus uses an influence coefficient calculating method to allow a rotor supported on active magnetic bearings to rotate about an inertial axis which, due to possible imbalances in the rotor, may be different from the geometric axis of the rotor, without transmitting imbalance forces to the housing of the active magnetic bearings.

8 Claims, 1 Drawing Sheet $e_x = E \cos(wt + \phi)$
$e_y = E \sin(wt + \phi)$

VIRTUAL ROTOR BALANCING IN MAGNETIC BEARINGS

BACKGROUND OF THE INVENTION

This application is related to commonly-owned application Ser. No. 521,158, filed May 7, 1990.

FIELD OF THE INVENTION

This invention pertains to the balancing and stabilizing of rotating machinery through the control of active magnetic bearings.

DESCRIPTION OF THE PRIOR ART

The advantages of active magnetic bearings include no contact between moving parts, no lubricant and small power loss. Active magnetic bearings are also known for their versatility in controlling rotor vibrations. The stiffness and damping of active magnetic bearings can be adjusted through electronic means for specific rotordynamic applications.

For example, it is well-known to use a tracking notch filter in the control electronics of an active magnetic bearing. The notch filter blocks the bearing response to synchronous vibration (i.e., at the rotating frequency), and essentially makes the magnetic bearing very soft at only the rotating frequency. The rotor experiencing no resistance in rotation tends to spin about its inertial axis (which passes through the center of gravity) rather than the geometric axis, and therefore generates no imbalance force.

However, the balancing approach using a notch filter is subject to system instabilities as there is a limit to how soft the active magnetic bearing response can be made at the synchronous frequency without causing an unstable mode near the frequency. See H. M. Chen, "Magnetic Bearing Stiffness Control Using Frequency Band Filtering", Rotordynamics Instability Problems in High-Performance Turbomachinery, 1988, NASA Conference Publication 3026, pages 341-352. Similar approaches have used modified filter schemes with a tracking differential notch filter or a disturbance estimator. See B. G. Johnson et al., "Active Synchronous Response Control of Rigid-Body Rotors", C290/88, I Mech. E., 1988; and K. D. Reinig and A. A. Desrochers, "Disturbance Accommodating Controllers for Rotating Mechanical Systems", A.S.M.E., Journal of Dynamic Systems, Measurement, and Control, Vol. 108, pp. 24-31, March 1986. When two or more vibrational modes are involved, the implementation of the estimator approach can be complicated.

OBJECTIVES AND SUMMARY OF THE INVENTION

The object of this invention is to provide a method and apparatus for the balancing and stabilization of rotating machinery through the control of active magnetic bearings allowing an unbalanced rotor to rotate about its inertial axis, transmitting no imbalance forces to the active magnetic bearing housing without causing an unstable mode near the synchronous frequency, and which is not overly complex to implement.

This invention uses straightforward balancing which treats each magnetic bearing as a balancing plane. The rotor is forced to rotate on its inertial axis at all speeds. Therefore, the rotational frequency of the rotor can be changed without encountering critical imbalance responses. Furthermore, the additional bearing control associated with this method and apparatus is equivalent to generating rotating forces on the rotor, not manipulating the bearing stiffness and damping. Thus, no inherent instability problem occurs.

The apparatus identifies the rotor mass eccentricities (vectors) of the inertial axis at the active magnetic bearings as the rotor spins on its geometric axis. The eccentricities of the rotor are identified using an influence-coefficient method similar to the conventional two-plane balancing method. Each active magnetic bearing axis is controlled by a Proportional Integral Derivative (hereinafter "PID") controller, and additional control is provided to shift the rotating axis from the geometric axis to the inertial axis. The sine-wave generator produces a sine-wave in synchronization therewith. The output of the sine-wave generator is adjusted in amplitudes and phases according to the eccentricity vectors and then subtracted from the displacement measurements before feeding to the PID controllers. The signal subtraction moves the active magnetic bearing control reference to the inertial axis. The rotor freely cranks with the mass eccentricity. The displacement probes sees the eccentricity. The controller does not respond to it. Thus, there is no imbalance force transmitted to the housing of the active magnetic bearing.

BRIEF DESCRIPTION OF THE DRAWINGS

The advantages of the invention will become apparent from the following description and claims, and from the accompanying drawings, wherein:

DETAILED DESCRIPTION OF THE PREFERRED EMBODIMENT

Figure 1A:
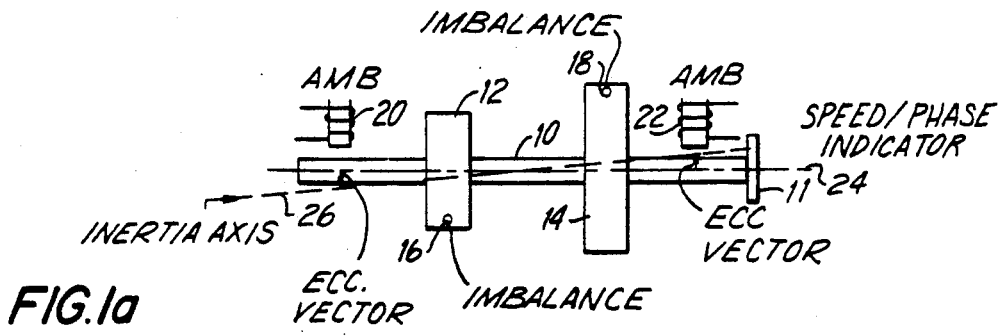
FIG. 1a is a side view of an imbalance rotor supported by active magnetic bearings.

Referring now to the drawings in detail wherein like numerals indicate like elements throughout the several views, FIG. 1a shows a rotor 10 with a speed/phase indicator 11 and two disks 12, 14 which include imbalances 16, 18. Rotor 10 is supported by two active magnetic bearings 20, 22. Each active magnetic bearing 20, 22 is controlled in two independent axes Without the special control of this invention, rotor 10 would whirl around geometric axis 24 in the presence of imbalances 16, 18 and transmit imbalance forces to bearings 20, 22.

Figure 1B:
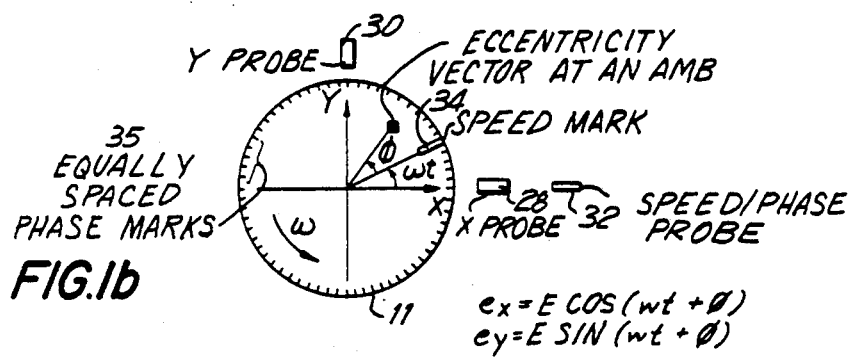
FIG. 1b is a cross-sectional view of the invention, showing the relationship of the probes to the rotor.

FIG. 1b discloses x-probe 28 and y-probe 30 of a bearing and a speed/phase probe 32 which detects speed mark 34 and phase marks 35 on the speed phase indicator.

Figure 2:
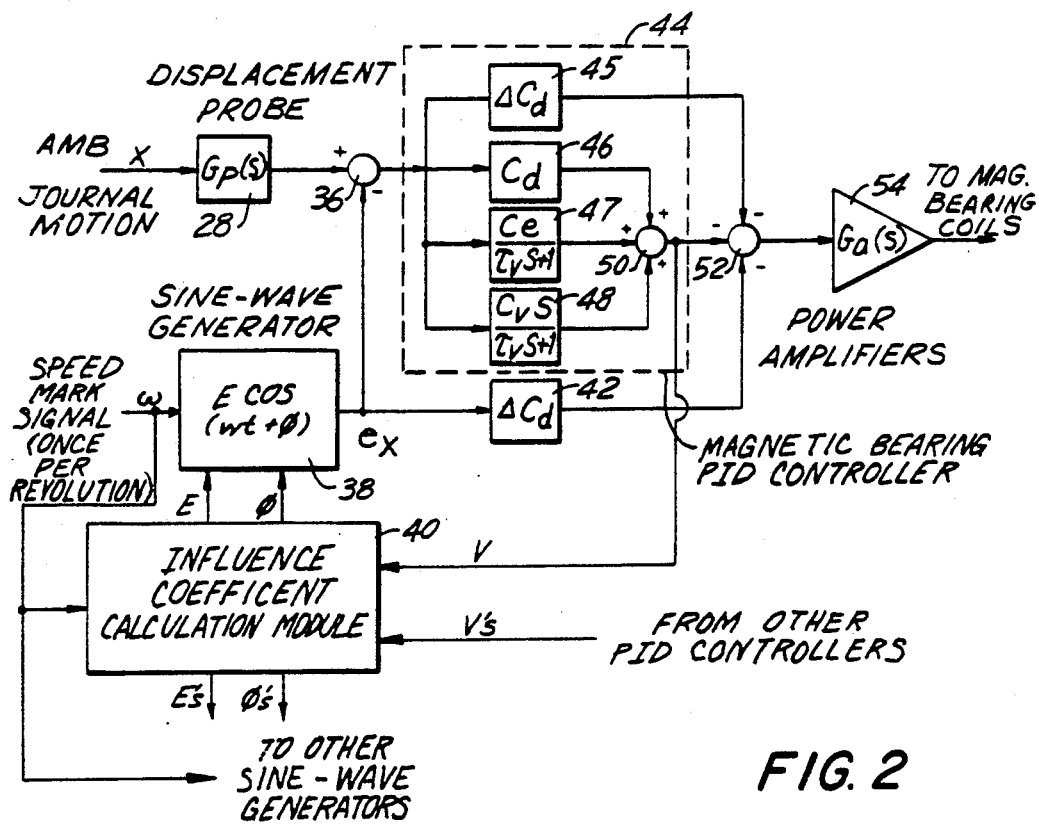
FIG. 2 is a schematic of the control system of the invention.

FIG. 2 discloses the schematic of the control system of the invention showing only details of one of four independently controlled axes. X-probe 28 (parallel circuitry is provided for y-probe 30) provides a first input to adder 36. Probe 32 provides a once-per-revolution signal $\omega$ to sine-wave generator 38. Influence coefficient calculation module 40 provides values of E and $\Phi$ to sine-wave generator 38. Sine-wave generator 38 outputs a value of $e_x = E \cos(\omega t + \Phi)$ which is subtracted by adder 36 from the displacement measurement by probe 28. The output of sine-wave generator 38 is also input to feed forward path 42 (which includes gain $\Delta C_d$).

The output of adder 36 is received by magnetic bearing PID controller 44. Magnetic bearing PID controller 44 functionally includes four multipliers 45, 46, 47 and 48, each receiving the output of adder 36. The function of multipliers 45, 46, 47, 48 will become apparent from the forthcoming derivation. The outputs of multipliers 46, 47 and 48 are received and added by adder 50. The outputs of multiplier 45, adder 50, and feed forward path 42 are received and subtracted by adder 52. The output of adder 52 is received by power amplifier 54 which has a transfer function of $G_a(s)$. The output of power amplifier 54 is received by the coils of active magnetic bearing 20 or 22.

In operation, influence coefficient calculation module 40, preferably a digital computer, identifies the eccentricity (expressed as a vector) of the inertial axis at each active magnetic bearing 20, 22. The influence-coefficient method is similar to conventional two-plane rotor balancing and is well-known in the prior art. To apply this method, trial eccentricity vectors $(E,\Phi)$ can be provided by module 40 to sine-wave generators 38. Module 40 then measures the changes of output voltage signals V of all adders 50. A trial eccentricity vector is applied to one controller each time and the output changes of all adders 50 due to the trial vector are recorded. The relation between the trial vectors and adder 50 output changes is called an influence coefficient matrix. The matrix, once determined, will be used to calculate the eccentricity vectors which will eliminate the synchronods signals in all adder 50 output. Feed forward path 42 serves to null the negative spring effect of the magnetic field due to the bias currents of active magnetic bearings 20, 22.

The active magnetic bearing regulating force in the control axis of FIG. 2 is:

$$F_x = k_i i_x + k_m x$$

where:
$k_1$ = current stiffness as a function of the bias current and air gap
$k_m$ = negative stiffness as a function of the bias current and air gap
$x$ = active magnetic bearing journal displacement The regulating current is:

$$i_x = [(-\Delta C_d - C_d - C_e/(\tau_i s + 1) - C_v s/(\tau_v s + 1))(G_p(s) - e_x) - \Delta C_d e_x] G_a(s)$$

where:
$\Delta C_d$ = proportional gain for nulling negative stiffness $K_m$
$C_d$ = proportional gain for dynamic stiffness control
$C_e$ = integral gain for static stiffness control
$C_v$ = derivative gain for damping control
$G_p(s)$ = displacement probe gain and low-pass filter
$G_a(s)$ = amplifier/coil gain including low-pass effect due to slew-rate limit
$e_x = E \cos(\omega + \Phi)$ Substituting the above equation for $i_x$ into the above equation for the equation for $F_x$ and defining $\Delta C_d$ as $K_m/(K_i G_p G_a)$ in rotating frequency range, and $T(s)$ as $C_d + C_e/(\tau_i s + 1) + C_v s/(\tau_v s + 1)$, the following equation is derived:

$$F_x = -K_i G_p G_a T(s) X + K_i G_a T(s) e_x$$

Where the first term is the normal active magnetic stiffness and damping whereas the second term is the sinusoidal force generated in the active magnetic bearing. This second term is a forcing term because $e_x$ has constant amplitude and phase. The addition of the sine-wave generator 38 and associated components does not change the active magnetic bearing stiffness and damping. Therefore, the system stability is not affected the apparatus of this invention. The adjustment of E and $\Phi$ can be made automatically. The influence coefficients can be stored for periodically updating the eccentricity vectors. If a blade is lost, for example, new eccentricity vectors can be calculated immediately.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An apparatus for allowing a rotor supported by magnetic bearings to rotate about an inertial axis and inhibiting forces on the magnetic bearings caused by eccentricities in the rotation of the rotor, comprising:
   probe means for determining a position of the rotor;
   calculation means responsive to said probe means for calculating an eccentricity of the rotor;
   sinusoidal wave generating means responsive to said calculation means;
   controller means responsive to said sinusoidal wave generating means; and
   wherein control signals are transmitted from said controller means to coils of the magnetic bearings thereby allowing the rotor to rotate about the inertial axis and inhibiting forces on the magnetic bearings caused by eccentricities in the rotation of the rotor.

2. The apparatus of claim 1 wherein said calculation means includes an influence coefficient calculating means.

3. An apparatus for allowing a rotor supported by magnetic bearings to rotate about an inertial axis and inhibiting forces on the magnetic bearings caused by eccentricities in the rotation of the rotor, comprising:
   probe means for determining a position of the rotor;
   calculation means responsive to said probe means for calculating an eccentricity of the rotor, including an influence coefficient calculating means;
   sinusoidal wave generating means responsive to said calculation means;
   controller means responsive to said sinusoidal wave generating means;
   wherein control signals are transmitted from said controller means to coils of the magnetic bearings; and
   wherein a difference of output from said probe means and output of said sinusoidal wave generator is input to said controller means.

4. The apparatus of claim 3 further including a feed forward path from said sinusoidal wave generating means to an adding/subtracting means, wherein said adding/subtracting means combines output from said controller means aid said feed forward path, and wherein the output of said adding/subtracting means is amplified to generate said control signals to the magnetic bearings.

5. A method for allowing a rotor supported by magnetic bearings to rotate about an inertial axis and inhibiting forces on the magnetic bearings caused by eccentricities in the rotation of the rotor, comprising the steps of:

determining a position of the rotor;

calculating an eccentricity of the rotor in response to said determining step;

generating sinusoidal waves responsive to said calculating step;

generating control signals responsive to said sinusoidal wave generating step and said determining step; and transmitting said control signals to coils of the magnetic bearings thereby allowing the rotor to rotate about the inertial axis and inhibiting forces on the magnetic bearings caused by eccentricities in the rotation of the rotor.

6. The method of claim 5 wherein said calculating step includes the step of calculating influence coefficients.

7. A method for allowing a rotor supported by magnetic bearings to rotate about an inertial axis and inhibiting forces on the magnetic bearings caused by eccentricities in the rotation of the rotor, comprising the steps of:

determining a position of the rotor;

calculating an eccentricity of the rotor by means of influence coefficients in response to said determining step;

generating sinusoidal waves responsive to said calculating step;

generating control signals responsive to said sinusoidal wave generating step and said determining step; and transmitting said control signals to coils of the magnetic bearings; and calculating a difference of output from said determining step and output of said sinusoidal wave generating step and inputting said difference in said step of generating control signals.

8. The method of claim 7 further including the step of providing a feed forward path from output from said sinusoidal wave generating step and providing an adding/subtracting means, wherein said adding/subtracting means combines output from said control signal generating step and said feed forward path, and wherein said control signal generating step further includes the step of amplifying output of said adding/subtracting means.

* * * * *